US012286076B2

(12) United States Patent
Diewald et al.

(10) Patent No.: US 12,286,076 B2
(45) Date of Patent: Apr. 29, 2025

(54) METHOD FOR OPERATING AN ACCESS SYSTEM FOR A VEHICLE, AND VEHICLE

(71) Applicant: Bayerische Motoren Werke Aktiengesellschaft, Munich (DE)

(72) Inventors: Stefan Diewald, Moosburg a. d. Isar (DE); Bernhard Gasser, Munich (DE); Marcus Hilbel, Schwabmuenchen (DE); Martin Kaltenbrunner, Taufkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/776,867

(22) PCT Filed: May 27, 2020

(86) PCT No.: PCT/EP2020/064689
§ 371 (c)(1),
(2) Date: May 13, 2022

(87) PCT Pub. No.: WO2021/121671
PCT Pub. Date: Jun. 24, 2021

(65) Prior Publication Data
US 2022/0388480 A1    Dec. 8, 2022

(30) Foreign Application Priority Data

Dec. 17, 2019  (DE) ............... 10 2019 134 815.3

(51) Int. Cl.
*B60R 25/40* (2013.01)
*B60R 25/24* (2013.01)

(52) U.S. Cl.
CPC ............. *B60R 25/40* (2013.01); *B60R 25/24* (2013.01)

(58) Field of Classification Search
CPC ................ B60R 25/40; B60R 25/24
See application file for complete search history.

(56) References Cited

U.S. PATENT DOCUMENTS 10,147,253 B1     12/2018   Proefke et al.
2002/0008644 A1*   1/2002   Flick ................. B60R 25/33
                                                    340/988

(Continued)

FOREIGN PATENT DOCUMENTS

CN     109398309 A      3/2019
CN     211493676   *    9/2020

(Continued)

OTHER PUBLICATIONS

Du (Year: 2019).*

(Continued)

*Primary Examiner* — Thomas D Alunkal
(74) *Attorney, Agent, or Firm* — Crowell & Moring LLP

(57) ABSTRACT

A method and apparatus for operating an access system for a vehicle, in particular of an electric motor-powered motor vehicle, provides for an external feeding device of the vehicle to be is unlocked when a predetermined voltage value of an energy accumulator of the vehicle is reached or fallen below. The external feeding device connected to at least one vehicle access part of a control device of the vehicle, and is configured to be connected to an external electrical energy supply device to supplied electrical energy to the vehicle access part of the control device. When the externally-supplied electrical energy is received, the vehicle access part of the control device is configured to allow access to the vehicle.

9 Claims, 1 Drawing Sheet

(56) References Cited

U.S. PATENT DOCUMENTS

| | | | |
|---|---|---|---|
| 2011/0022256 A1 | 1/2011 | Asada et al. | |
| 2014/0152091 A1 | 6/2014 | Mueller et al. | |
| 2014/0316612 A1* | 10/2014 | Banter | B60R 25/01 701/2 |
| 2014/0347163 A1* | 11/2014 | Banter | B60R 25/01 340/5.72 |
| 2015/0149221 A1* | 5/2015 | Tremblay | B60L 53/305 320/109 |
| 2016/0371907 A1 | 12/2016 | Ma et al. | |
| 2017/0072811 A1* | 3/2017 | Tabatowski-Bush | G01R 31/3835 |
| 2017/0089104 A1 | 3/2017 | Kowalewski et al. | |
| 2017/0297443 A1* | 10/2017 | You | H01R 13/6395 |
| 2017/0297512 A1 | 10/2017 | Eling et al. | |
| 2020/0070775 A1* | 3/2020 | Linden | B60R 16/033 |
| 2020/0216031 A1 | 7/2020 | Emmerling et al. | |
| 2020/0369228 A1* | 11/2020 | Kageyama | H02J 9/061 |

FOREIGN PATENT DOCUMENTS

| | | |
|---|---|---|
| DE | 197 55 093 A1 | 6/1999 |
| DE | 10 2006 002 119 A1 | 7/2006 |
| DE | 10 2006 035 803 A1 | 2/2008 |
| DE | 10 2012 014 471 A1 | 1/2013 |
| DE | 10 2012 004 000 A1 | 8/2013 |
| DE | 11 2013 000 504 T5 | 10/2014 |
| DE | 10 2017 107 562 A1 | 10/2017 |
| DE | 10 2017 214 105 A1 | 2/2019 |
| DE | 10 2018 100 551 A1 | 7/2019 |
| DE | 10 2018 212 407 B3 | 9/2019 |
| JP | 7-293074 A | 11/1995 |
| JP | 2011-69115 A | 4/2011 |
| WO | WO 2015/101210 A1 | 7/2015 |

OTHER PUBLICATIONS

International Search Report (PCT/ISA/210) issued in PCT Application No. PCT/EP2020/064689 dated Sep. 14, 2020 with English translation (four (4) pages).

German-language Written Opinion (PCT/ISA/237) issued in PCT Application No. PCT/EP2020/064689 dated Sep. 14, 2020 (six (6) pages).

German-language Search Report issued in German Application No. 10 2019 134 815.3 dated Mar. 11, 2020 with partial English translation (10 pages).

Chinese-language Office Action issued in Chinese Application No. 202080073745.4 dated Apr. 13, 2023 with English translation (16 pages).

German-language European Office Action issued in European Application No. 20 729 980.1 dated Feb. 10, 2025 (5 pages).

* cited by examiner

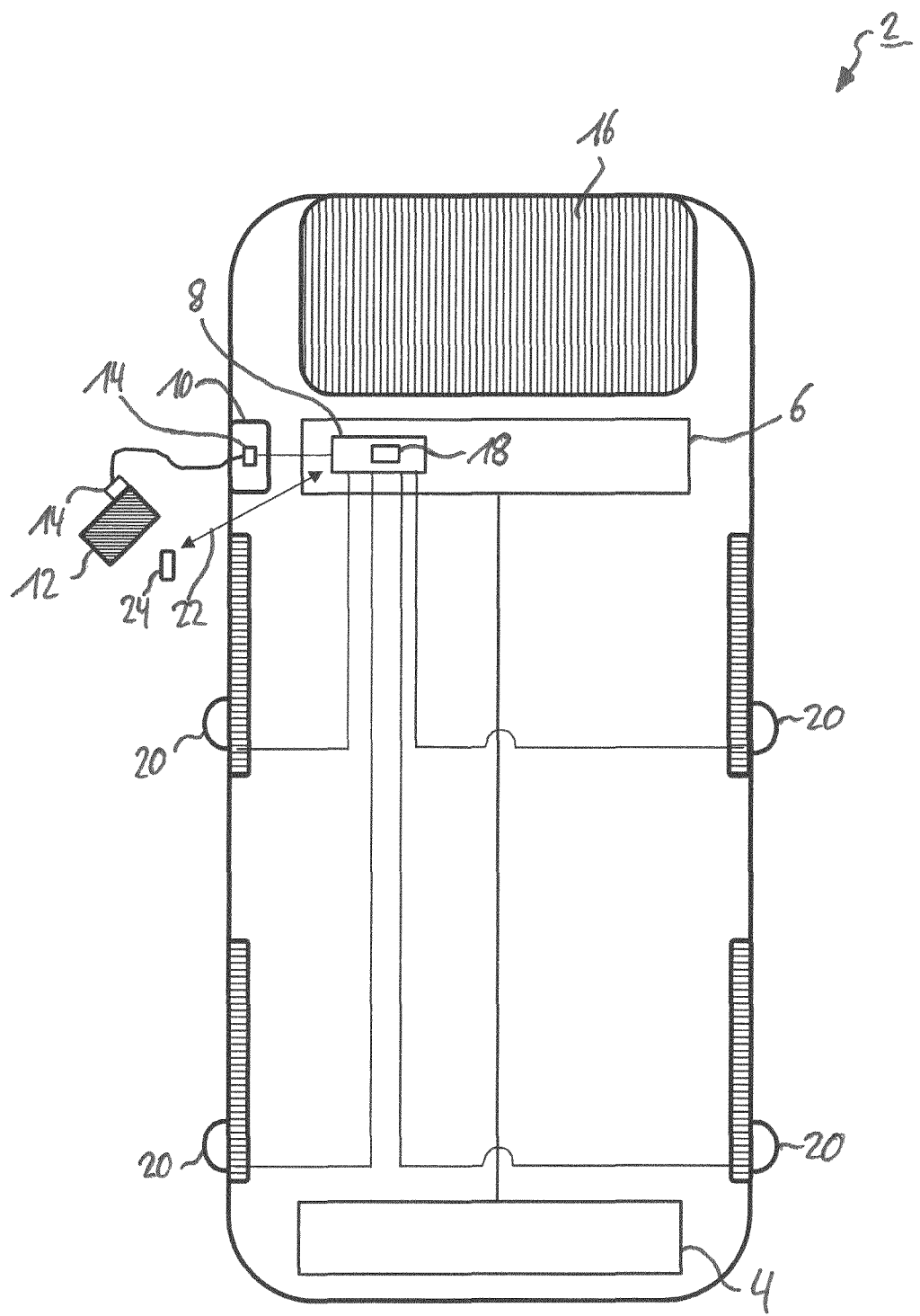

METHOD FOR OPERATING AN ACCESS SYSTEM FOR A VEHICLE, AND VEHICLE

BACKGROUND AND SUMMARY OF THE INVENTION

The invention relates to a method for operating an access system for a vehicle, in particular for a motor vehicle driven by an electric motor. The invention also relates to a motor vehicle.

In the context of the development of new vehicles and the advent of digitization in the automotive field, conventional mechanical keys are intended to be replaced preferably with digital keys.

Digital keys of this kind make it possible, for example, for keys in the conventional sense no longer to be needed. Instead, the digital keys are stored on mobile terminals or on the key body, with the result that, according to this example, the mobile terminal or the key body then acts as a key for the vehicle. In the context of this invention, the key body is understood to mean, for example, an electronic radio remote control with buttons. In general, the key body can be understood to mean a key which, in particular, has no mechanical parts for unlocking or locking the vehicle. In keys of this type, this preferably takes place electronically. If digital keys are mentioned below, these thus refer to a key stored on a mobile terminal and/or to a key which preferably does not have any mechanical parts. The authorization to open and close and also to start the vehicle is then stored for example on the mobile terminal in the form of a digital signature which is recognized by the vehicle.

However, this key concept has a disadvantage if the vehicle is no longer able to be unlocked in the manner described above, also referred to as the electronic manner. A scenario of this kind occurs, for example, when an energy store of the vehicle is discharged to such an extent that it is no longer capable of supplying the components required for electronically unlocking the vehicle with sufficient electrical energy. If a mechanical key is present, it is possible, in this case, to enable access to the vehicle by means of the mechanical key.

Keeping a key that is still mechanical is associated only with a high degree of complexity in terms of logistics and configuration, especially for the abovementioned motor vehicles driven by an electric motor. Moreover, hardware measures are required in the vehicle for opening it (lock cylinder, Bowden cable, lock mechanism, etc.). In addition, the mechanical part of the key also affects a visual appearance of the key with regard to size and weight.

Taking this as a starting point, the invention is therefore based on the object of specifying a method for operating an access system for a vehicle and a vehicle, using which access to the vehicle is achieved in a simple manner without a mechanical key.

With regard to the method, the object is achieved according to the invention by a method as recited in the claims. With regard to the vehicle, the object is achieved according to the invention by a vehicle as recited in the claims.

Advantageous configurations, developments and variants are the subject matter of the dependent claims.

The advantages and preferred configurations cited with respect to the method can be applied analogously to the vehicle and vice versa.

Specifically, the object with respect to the method is achieved by a method for operating an access system for a vehicle, in particular for a motor vehicle driven by an electric motor. In this case, the motor vehicle driven by an electric motor can be understood to mean a motor vehicle, for example a passenger motor vehicle, which has, either in addition to an internal combustion engine or exclusively, an electric motor as a drive motor.

In a first step, when a predetermined voltage value of an energy store of the vehicle is reached or fallen below, an extraneous feed device of the vehicle is released or unlocked. In connection with the present invention, the energy store of the vehicle is in this case preferably understood to mean a vehicle battery and specifically an energy store which supplies at least the components that are designed to lock and unlock the vehicle with electrical energy. The energy store is thus preferably a low-voltage battery with a maximum voltage level of 12 volts. In connection with the present invention, the predetermined voltage value of the energy store is understood to mean a voltage value that corresponds, for example, to 5% to 10% of the maximum voltage level of the energy store. For example, in the case of a 12 V low-voltage battery, the predetermined voltage value thus has a value in the range from 0.6 V to 1.2 V. In this case, the predetermined voltage value is, for example, stored on an energy management system which records an actual value of the energy store voltage and compares it with the predetermined value.

In connection with the present invention, the extraneous feed device of the vehicle is understood to mean a connector of the vehicle for an external energy supply. In this case, unlocked can be understood to mean that access to the extraneous feed device is enabled. In other words, the extraneous feed device is, for example, covered by a flap and is not accessible prior to the predetermined voltage value of the energy store being reached or fallen below.

At least a vehicle access portion of a control unit of the vehicle is then supplied with electrical energy by means of an external extraneous supply means via the extraneous feed device. In this case, the vehicle access portion of the control unit is preferably understood to mean the part of the control unit and/or of an on-board electrical system infrastructure of the vehicle responsible for locking and/or releasing the doors or other possible access means of the vehicle. For this purpose, the extraneous supply means is electrically connected to the vehicle and specifically at least to the vehicle access portion via the extraneous feed device.

The external extraneous supply means can in this case be understood to mean an external energy store which is designed to deliver electrical energy, specifically via the extraneous feed device, to the vehicle.

In a next step, the locking of the vehicle is then released by the vehicle access portion of the control unit supplied with electrical energy, such that access to the vehicle is enabled. In the context of the present invention, enabling access to the vehicle can be understood to mean that, after the vehicle portion has been supplied with electrical energy, the driver can use their preferably digital key for opening as usual by means of an unlocking command and thus obtains access thereto. The unlocking command may in this case, for example, be made by pressing a button on the digital key, by touching a sensor surface of the exterior door handle or by means of a distance detection of the digital key, in which case the unlocking command is transmitted if the digital key is within a defined radius around the vehicle. Provision is not made, in particular, for enabling access without the unlocking command.

This makes it possible, specifically without the presence of a mechanical key, to enable access to the vehicle even in the case that the energy store is discharged, since no mechanical components are required for this purpose. The essence of the present invention therefore resides in a temporary, external supply of energy to the part (vehicle access portion) of the vehicle that is responsible for access to the vehicle, i.e. specifically for locking and unlocking the vehicle. Specifically in the case of a purely digital vehicle key, access to the vehicle thus continues to be ensured in an emergency since the measures required for this purpose (unlocking and releasing of the extraneous feed device) originate from the vehicle, since the latter preferably monitors the voltage value of the energy store and, if the predetermined voltage value of the energy store is fallen below as described above, unlocks and releases the extraneous feed device for the external supply of energy without any action or intervention by the driver. Unlocking by means of a mechanical key is thus no longer absolutely necessary. In addition, it is ensured that unauthorized access to the vehicle does not take place since the extraneous feed device is not accessible in a normal situation, i.e. for example when the energy store is fully charged.

Moreover, it is ensured that the enabled access to the vehicle allows subsequent measures to be taken for starting the vehicle again. For example, after access to the vehicle has been enabled, the hood of the vehicle can be opened from the passenger compartment, with the result that actual emergency charging connectors for the energy store of the vehicle are released.

The method described above is applicable, according to the invention, to all locks found in the field of motor vehicles. This includes mechanical locks, for which the energization activates a mechanical action for unlocking and locking, and electrical locks, for which the "locked" and "unlocked" statuses are logic states. A combination of the abovementioned two locks is also likewise included.

In one embodiment, the vehicle access portion is electrically connected to an on-board electrical system of the vehicle in such a manner that only the vehicle access portion is supplied with electrical energy by the external energy supply by means of the extraneous supply means via the extraneous feed device. This ensures that specifically only the portion of the vehicle required for access to the vehicle is supplied with electrical energy, and that energy is thus saved. In addition, this makes it possible not to allow any current, and thus any supply of energy, from entering the on-board electrical system of the vehicle from outside (i.e. externally) if the voltage level of the energy store is sufficient, i.e. if the predetermined voltage value has not been reached or fallen below. This has the advantage of avoiding faulty operation.

According to an alternative embodiment, the entire control unit, and thus not only the vehicle access portion of the control unit, is supplied with electrical energy by means of the external extraneous supply means via the extraneous feed device. This has the advantage of simultaneously enabling further external charging possibilities, such as the emergency charging via the engine compartment mentioned above by way of example, in the case of a sufficient energy supply to the entire control unit and to the electrical infrastructure of the vehicle connected thereto.

According to one expedient embodiment, the external extraneous supply means and the extraneous feed device have mutually corresponding connectors, which are preferably designed in accordance with the USB Power Delivery Standard. Specifically, the connectors are in the form of USB-C connectors, via which electric power with values of up to 60 W can be transmitted. This allows a fast external supply of energy at least to the vehicle access portion of the control unit. In addition, specifically a USB-C connector is nowadays, and will also be in the future, installed in various components/units that serve as external extraneous supply means, with the result that the extraneous feed device of the vehicle is compatible with and for a plurality of feeding units. A power bank, a smartphone or a laptop may thus, for example, serve as an external extraneous feed means.

In one embodiment, in addition to the vehicle access portion, at least one radio receiver for a central locking system of the vehicle is also supplied with electrical energy by the external extraneous supply means. In this case, the at least one radio receiver is a radio receiver designed to receive the signal of one or more digital keys, in particular the unlocking command already mentioned above. Thus, this alternative or supplementary embodiment makes it possible to additionally enable access to the vehicle via an available key by means of authentication.

In a further alternative or supplementary embodiment, only one door lock of the vehicle, and thus only one door, is unlocked by the vehicle access portion supplied with electrical energy. This saves energy in that the electrical energy that has to be supplied externally to the vehicle access portion in order to enable access to the vehicle is reduced, since the supply of electric power to the vehicle access portion needs only to be sufficient to unlock one rather than, for example, all of the doors of the vehicle.

In a supplementary or alternative embodiment, a wireless data connection is formed between a key of the vehicle and the vehicle access portion, such that the key is activated when the vehicle access portion is supplied with electrical energy. In this case, activated is understood to mean that the key is, for example, provided with a signature of the vehicle, such that the key can then be used to open and close only this vehicle. This procedure is also known as "pairing". The embodiment described above has proven advantageous in particular for the case in which the predetermined voltage value has been reached or fallen below and only a spare key, which, however, has never before been used within or for the vehicle, is available.

This, and specifically the activation of the key by means of the wireless data connection, thus enables access to the vehicle even in this case. The wireless data connection for activating the key is preferably implemented in encrypted form in this case.

Specifically, the object with respect to the vehicle is achieved by a vehicle, in particular a motor vehicle driven by an electric motor, which has at least one energy store and an extraneous feed device. In this case, the extraneous feed device can be unlocked and thus released depending on a voltage value of an energy store.

The vehicle according to the invention is in particular designed to carry out the method described above, such that the extraneous feed device is set up to supply at least a vehicle access portion of a control unit with electrical energy by means of an external extraneous supply means so as to unblock access to the vehicle.

In one embodiment, the extraneous feed device is electrically connected to the vehicle access portion of the control unit independently of an on-board electrical system of the vehicle.

Preferably, the extraneous feed device and the extraneous supply means have mutually corresponding connectors, in particular in accordance with the USB Power Delivery Standard.

An exemplary embodiment of the invention is explained in more detail below with reference to the FIGURE, in which, partly in a very simplified representation.

BRIEF DESCRIPTION OF THE DRAWINGS

FIG. 1 shows a schematic illustration of a vehicle designed to carry out the method according to the invention.

DETAILED DESCRIPTION

The vehicle 2 shown in FIG. 1 is designed to carry out a method according to the invention for operating an access system. The vehicle 2 in the exemplary embodiment according to FIG. 1 is in the form of a motor vehicle driven by an electric motor. This means that the vehicle 2 has an electric motor (not shown) as a drive motor. In addition, the vehicle 2 has an energy store 4, which specifically supplies all the components of the vehicle 2 that are not responsible for propulsion with electrical energy. Such components are usually supplied with electrical energy via a 12 V on-board electrical system, for which reason the energy store 4 in the exemplary embodiment is in the form of a battery with a target voltage level of 12 V. Alternatively, the energy store is in the form of a 24 V battery, but this does not have any effect on the method according to the invention.

Furthermore, the vehicle 2 has a control unit 6, which has a vehicle access portion 8. The vehicle access portion 8 serves to actuate at least one door lock 20, in particular all the door locks 20 of the vehicle 2, and thus enables the vehicle 2 to be locked or unlocked.

In addition, the vehicle has an extraneous feed device 10, which is unlocked and thus released according to the method according to the invention when a predetermined voltage value of the energy store 4 is fallen below. For this purpose, the extraneous feed device 10 is covered for example with a flap (not shown), which, when the predetermined voltage value of the energy store 4 is reached or fallen below as mentioned above, is unlocked and can be opened. In this case, the extraneous feed device 10 serves for an external (emergency) supply of electrical energy to the vehicle access portion 8. For this purpose, use is specifically made of an extraneous supply means 12, which is preferably connected in a wired manner to the vehicle 2 and specifically to the vehicle access portion 8 via the extraneous feed device 10. For this purpose, both the external extraneous supply means 12 and the extraneous feed device 10 have mutually corresponding connectors 14, which are preferably designed in accordance with the USB Power Delivery Standard. The external extraneous supply means 12 is, for example, a smartphone, a power bank, a laptop or another, in particular portable, energy store, which can either habitually or easily be carried by the driver of the vehicle 2.

In order to enable access to the vehicle 2 specifically in the case of a discharged energy store 4, the extraneous feed device 10 is unlocked and thus released according to the method according to the invention as mentioned above.

It is then made possible to supply at least the vehicle access portion 8 of the control unit 6, and alternatively the entire control unit 6, with electrical energy by means of the external extraneous supply means 12 via the extraneous feed device 10 so as to release a door lock. In other words, at least the vehicle access portion 8 is provided with an "emergency supply" of electric power via the extraneous supply means 12, with the result that the vehicle 2 is able to be unlocked by means of an unlocking command. The access to the vehicle 2 that has been ensured in this way allows, for example, the hood 16 of the vehicle 2 to be unlocked from the passenger compartment and to be opened, such that the energy store 4 can be fully charged again via charging connectors (not shown) located under the hood 16.

The background of the method according to the invention is thus specifically ensuring and enabling access to the vehicle when no mechanical key is present or provided. Specifically in the field of electromobility, but also in the context of digitization and in the field of autonomous driving, the issuing of a mechanical key is increasingly dispensed with.

Alternatively or additionally, in addition to the supply of electric power to the vehicle access portion 8, electric power is also supplied to at least one radio receiver 18, which serves to receive a signal transmitted by a central locking system in the form of a key, for example the unlocking command.

According to an alternative or supplementary configuration, only one door lock 20 of the vehicle 2 is unlocked by the vehicle access portion 8 supplied with electrical energy. In this case, the electrical energy which has to be supplied to ensure access can be reduced to a minimum, which has a positive effect on an energy consumption of the extraneous supply means 12 and a reduction in the charging time.

Furthermore alternatively or additionally, provision is made for a wireless data connection 22 (represented schematically in FIG. 1 by a double-headed arrow) to be formed between a key 24 of the vehicle 2 and the vehicle access portion 8 of the control unit 6. The key 24 may be either a key 24 (shown in FIG. 1) embodied separately from the external extraneous supply means 12, or alternatively the extraneous supply means 12 itself. Alternatively or additionally, the key 24 may also be a radio remote control of known type, which merely lacks any mechanical components for unlocking the vehicle 2 and is thus also in the form of a digital key 24. In this case, the unlocking command is preferably given in a known manner by pressing a button.

In this case, the key 24 is thus activated subsequent to, or in parallel with, the supply of electrical energy to the vehicle access portion 8, i.e. for example paired with a signature of the vehicle 2. This configuration is based on the idea that access to the vehicle 2 is thus also enabled if the energy store 4 is discharged as described above and, for example, only a (spare) key 24, which has never before been used to unlock or lock the vehicle 2, is available. The activation of the key 24 by means of the wireless data connection 22 means that the key 24 is thus subsequently available for use with the vehicle 2.

The invention is not restricted to the exemplary embodiment described above. Instead, other variants of the invention can also be derived therefrom by a person skilled in the art without departing from the subject matter of the invention. In particular, all of the individual features described in connection with the exemplary embodiment can additionally also be combined with one another in other ways without departing from the subject matter of the invention.

LIST OF REFERENCE SIGNS

2 Vehicle
4 Energy store
6 Control unit
8 Vehicle access portion
10 Extraneous feed device
12 Extraneous supply unit
14 Connectors
16 Hood
18 Radio receiver
20 Door lock
22 Wireless data connection
24 Key

What is claimed is:

1. A method for operating an access system for a vehicle, comprising the acts of:
   determining, by a control unit in the vehicle, whether a voltage of an energy store of the vehicle is at or below a predetermined voltage value;
   unlocking an extraneous feed device of the vehicle, based only on the control unit determining that the voltage is at or below the predetermined voltage value;
   supplying electrical energy via the extraneous feed device to only a vehicle access portion of the control unit of the vehicle; and
   releasing the vehicle from a locked state such that access to the vehicle is enabled in response to the vehicle access portion of the control unit receiving an unlocking command;
   wherein the vehicle access portion is electrically connected directly to an extraneous electrical energy supply device via the extraneous feed device.

2. The method according to claim 1, further comprising the act of:
   connecting an extraneous electrical energy supply device to the extraneous feed device,
   wherein the extraneous electrical energy supply device and the extraneous feed device have mutually compatible connectors.

3. The method according to claim 2, wherein
   the mutually compatible connectors conform to the USB Power Delivery Standard such that the extraneous electrical energy supply device is able to supply electrical energy via the extraneous feed device to at least the vehicle access portion of the control unit.

4. The method according to claim 1, wherein
   during the act of releasing the vehicle from the locked state, only one door lock of the vehicle is unlocked by the vehicle access portion of the control unit.

5. The method according to claim 1, further comprising the acts of:
   forming a wireless data connection between a key of the vehicle and the vehicle access portion of the control unit in response to the vehicle access portion of the control unit being supplied with electrical energy from the extraneous feed device.

6. The method according to claim 5, wherein
   the key is a digital key, and
   the digital key is authenticated in order to enable the unlocking of the vehicle.

7. A vehicle, comprising:
   at least one energy store;
   a control unit having a vehicle access portion and being configured to determine whether a voltage value of the energy store is at or below a predetermined voltage value; and
   an extraneous feed device configured to be unlocked based only on the control unit determining that the voltage value of the energy store is at or below the predetermined voltage value,
   wherein
   the extraneous feed device is configured to supply only the vehicle access portion of the control unit with electrical energy received from an extraneous electrical energy supply device,
   the vehicle access portion of the control unit is configured such that when supplied with the electrical energy received from the extraneous electrical energy supply device, the vehicle access portion of the control unit is capable of enabling access to the vehicle, and
   the vehicle access portion is electrically connected directly to an extraneous electrical energy supply device via the extraneous feed device.

8. The vehicle according to claim 7, wherein
   the extraneous feed device is electrically connected to the vehicle access portion of the control unit independently of an on-board electrical system of the vehicle.

9. The vehicle according to claim 7, wherein
   the extraneous feed device and the extraneous electrical energy supply device have mutually compatible connectors, and
   the mutually compatible connectors conform to the USB Power Delivery Standard such that the extraneous electrical energy supply device is able to supply electrical energy via the extraneous feed device to the vehicle access portion of the control unit.

* * * * *